(12) United States Patent
Bhatnagar et al.

(10) Patent No.: US 10,235,467 B2
(45) Date of Patent: Mar. 19, 2019

(54) PROVIDING SEARCH RESULTS BASED ON AN ESTIMATED AGE OF A CURRENT USER OF A MOBILE COMPUTING DEVICE

(71) Applicant: Samsung Electronics Co., Ltd., Suwon-si, Gyeonggi-do (KR)

(72) Inventors: Prateek Bhatnagar, Metairie, LA (US); Taher Savliwala, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 548 days.

(21) Appl. No.: 14/967,198

(22) Filed: Dec. 11, 2015

(65) Prior Publication Data

US 2017/0169113 A1    Jun. 15, 2017

(51) Int. Cl.
*G06F 17/30* (2006.01)

(52) U.S. Cl.
CPC .............................. *G06F 17/30867* (2013.01)

(58) Field of Classification Search
CPC ........... G06F 17/30525; G06F 17/3053; G06F 17/30699; G06F 17/30716; G06F 17/30867
USPC ........................................................ 707/730
See application file for complete search history.

(56) References Cited

U.S. PATENT DOCUMENTS

| | | | | |
|---|---|---|---|---|
| 2009/0116683 A1* | 5/2009 | Rhoads | ................. | G06T 1/0007 382/100 |
| 2014/0280120 A1* | 9/2014 | Sharp | .................. | G06F 17/3053 707/732 |
| 2014/0280121 A1* | 9/2014 | Sharp | .................. | G06F 17/3053 707/732 |
| 2014/0341442 A1* | 11/2014 | Lewis | ................ | G06K 9/00248 382/118 |
| 2015/0066941 A1* | 3/2015 | Martin | .............. | G06F 17/30321 707/741 |
| 2016/0098566 A1* | 4/2016 | Patil | ........................ | G06F 21/60 726/26 |
| 2016/0248766 A1* | 8/2016 | Tembey | .............. | H04L 63/0227 |

\* cited by examiner

*Primary Examiner* — Evan Aspinwall
(74) *Attorney, Agent, or Firm* — Jefferson IP Law, LLP

(57) ABSTRACT

A search server that provides search results to a mobile computing device based on an age of a current user of the mobile computing device. The search server receives a search request from the mobile computing device. The search request includes a search query, and an image captured by a front-facing camera of the mobile computing device. The search server estimates an age of the current user based on the image. The search server can estimate the age of the current user by extracting one or more facial features from the image, and determine the estimated age based on the extracted facial features. Upon estimating the age of the current user, the search server can filter out search results that may not be suitable for the current user based on the estimated age of the current user. The search server can also assign lower relevance scores to search results that may not be relevant to the current user based on the estimated age of the current user.

20 Claims, 6 Drawing Sheets

PROVIDING SEARCH RESULTS BASED ON AN ESTIMATED AGE OF A CURRENT USER OF A MOBILE COMPUTING DEVICE

TECHNICAL FIELD

This disclosure relates to providing search results to a mobile computing device based on an estimated age of a current user of the mobile computing device.

BACKGROUND

Many mobile computing devices can display search results in response to a search query. A mobile computing device can display a graphical user interface that allows a user of the mobile computing device to enter a search query. Upon receiving the search query from the user, the mobile computing device can transmit the search query to a search server. The search server can generate search results based on the search query. Upon generating the search results, the search server can send the search results to the mobile computing device. The mobile computing device receives the search results, and can display the search results on a display of the mobile computing device. Some search results may not be relevant, and/or suitable for a current user of the mobile computing device based on the age of the current user. Therefore, there is a need to provide search results that are relevant, and/or suitable based on the age of the current user.

SUMMARY

One aspect of the disclosure provides a search server that includes a network communication device, a storage device, and a processing device. The storage device may store a state data store that stores state records that correspond with application states. A state record may include information regarding the corresponding application state. A state record may a target age that indicates a target age group, and/or a target age value for the corresponding application state. The processing device executes computer-readable instructions that, when executed by the processing device, cause the processing device to receive, via the network communication device, a search request from a mobile computing device. The search request may include a search query with one or more search terms, and an image of a user currently using the mobile computing device. The image may have been captured by a front-facing camera of the mobile computing device.

The search server can extract one or more facial features from the image. The facial features may indicate distances between facial landmarks. The facial landmarks may include a left eye, a right eye, a nose, a mouth, a chin, and/or a top of the head of the user. The search server can determine an estimate of an age of the user based on the facial features extracted from the image. The search server can identify state records from the state data store based on the search terms of the search query. For each of the identified state records, the search server can retrieve a target age from the state record, compare the estimated age with the target age, and include the state record in a consideration set of state records based on the comparison.

For each state record in the consideration set, the search server can compute one or more scoring features, and determine a relevance score for the state record based on the one or more scoring features for the state record. The search server can generate search results based on the information stored in the state records that are in the consideration set. The search results may include the state access mechanism from each of the state records in the consideration set. Upon generating the search results, the search server can transmit the search results to the mobile computing device via the network communication device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The present disclosure provides a search system that provides search results to a mobile computing device based on an estimated age of a current user of the mobile computing device. The mobile computing device can send a search request to a search server. The search request can include a search query, and an image. The mobile computing device may capture the image using a front-facing camera of the mobile computing device. Hence, the image may include a facial image of the current user of the mobile computing device. A facial image refers to an image that includes a photographic representation of the face of a human being. The search server receives the search request from the mobile computing device. The search server determines an age of the current user based on the image. Determining the age of the current user may include estimating an age group of the user, and/or estimating an age value of the user. Upon determining the age of the user, the search server can provide search results that are suitable for the age. For example, if the search server determines that the current user is less than 13 years old, the search server can filter out search results that may not be appropriate for children.

Figure 1:
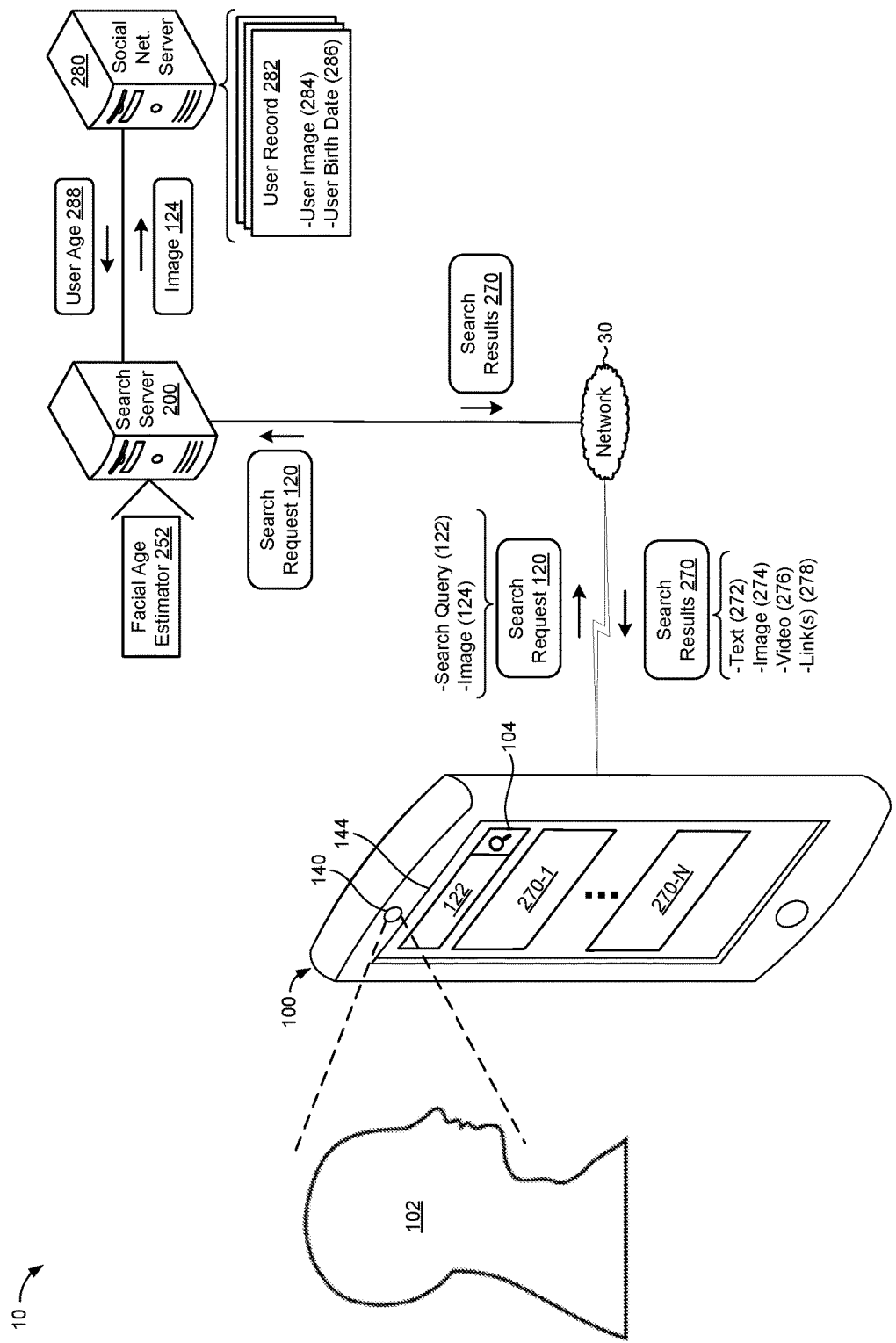
FIG. 1 is a schematic diagram of a search system that provides search results to a mobile computing device based on an estimated age of a current user of the mobile computing device.

FIG. 1 illustrates a search system 10 ("system 10", hereinafter) that provides search results 390 based on the age of a user 102. The system 10 includes a mobile computing device 100, and a search server 200. The mobile computing device 100 and the search server 200 may communicate via a network 30. The network 30 may include a wireless network (e.g., a cellular network), or a wired network. The mobile computing device 100 may include a camera 140, a display 144, and a microphone (not shown). The camera 140 may be referred to as a front-facing camera, for example, because the camera 140 faces a front side of the mobile computing device 100. The front side of the mobile computing device 100 may refer to the side with the display 144.

The mobile computing device 100 may display a graphical user interface (GUI) that allows the user 102 to provide a search query 122. For example, the GUI may include a search box 104 into which the user 102 can enter the search query 122. Alternatively, the user 102 can provide the search query 122 as an audio input via the microphone. When the mobile computing device 100 receives the search query 122 from the user 102, the mobile computing device 100 can capture an image 124 via the camera 140. Upon receiving the search query 122 and capturing the image 124, the mobile computing device 100 can generate a search request 120. The search request 120 can include the search query 122, and the image 124. The mobile computing device 100 can transmit the search request 120 to the server 200 via the network 30. In response to transmitting the search request 120, the mobile computing device 100 can receive the search results 270. The mobile computing device 100 can display the search results 270 on the display 144. The search results 270 may include a text string 272, an image 274, a video 276, and/or a link 278.

The search server 200 receives the search request 120 from the mobile computing device 100. The search server 200 may include a facial age estimator 252 that determines an age of the user 102 based on the image 124. The search server 200 may determine the age of the user 102 by determining an estimated age group, and/or an estimated age value of the user 102. The search server 200 can utilize the age in determining the search results 270. For example, the search server 200 can identify search results 270 based on the search query 122, and then filter out search results 270 that are not appropriate for the age. As described herein, the search server 200 can determine the age of the user 102 by extracting facial features from the image 124, and estimate the age based on the extracted facial features.

In some implementations, the search server 200 may utilize a social networking server 280 to determine the age of the user 102. The social networking server 280 may store various user records 282 that correspond with different users. A user record 282 may include a user image 284, and a user birth date 286. The search server 200 can transmit the image 124 to the social networking server 280. The social networking server 280 can compare the image 124 with the user images 284. If the image 124 matches a user image 284 from one of the user records 282, then the social networking server 280 can utilize the user birth date 286 from that user record 282 to determine a user age 288. The social networking server 280 can transmit the user age 288 to the search server 200, and the search server 200 can utilize the user age 288 in determining the search results 270. The search server 200 may utilize the social networking server 280 instead of, or in addition to utilizing the facial age estimator 252.

The user 102 may be referred to as a current user of the mobile computing device 100. By utilizing the image 124 to determine the age of the user 102, the search server 200 can estimate the age of a current user of the mobile computing device 100. Utilizing the image 124 to determine the age may be better than utilizing other static information (e.g., a user profile) to determine the age because the static information may not be associated with the current user of the mobile computing device 100. The static information may be associated with another user of the mobile computing device 100, and not the current user. For example, if a five year old child is using his parent's device, then the user profile for the device may inaccurately indicate the parent's age, and not the child's age.

Figure 2:
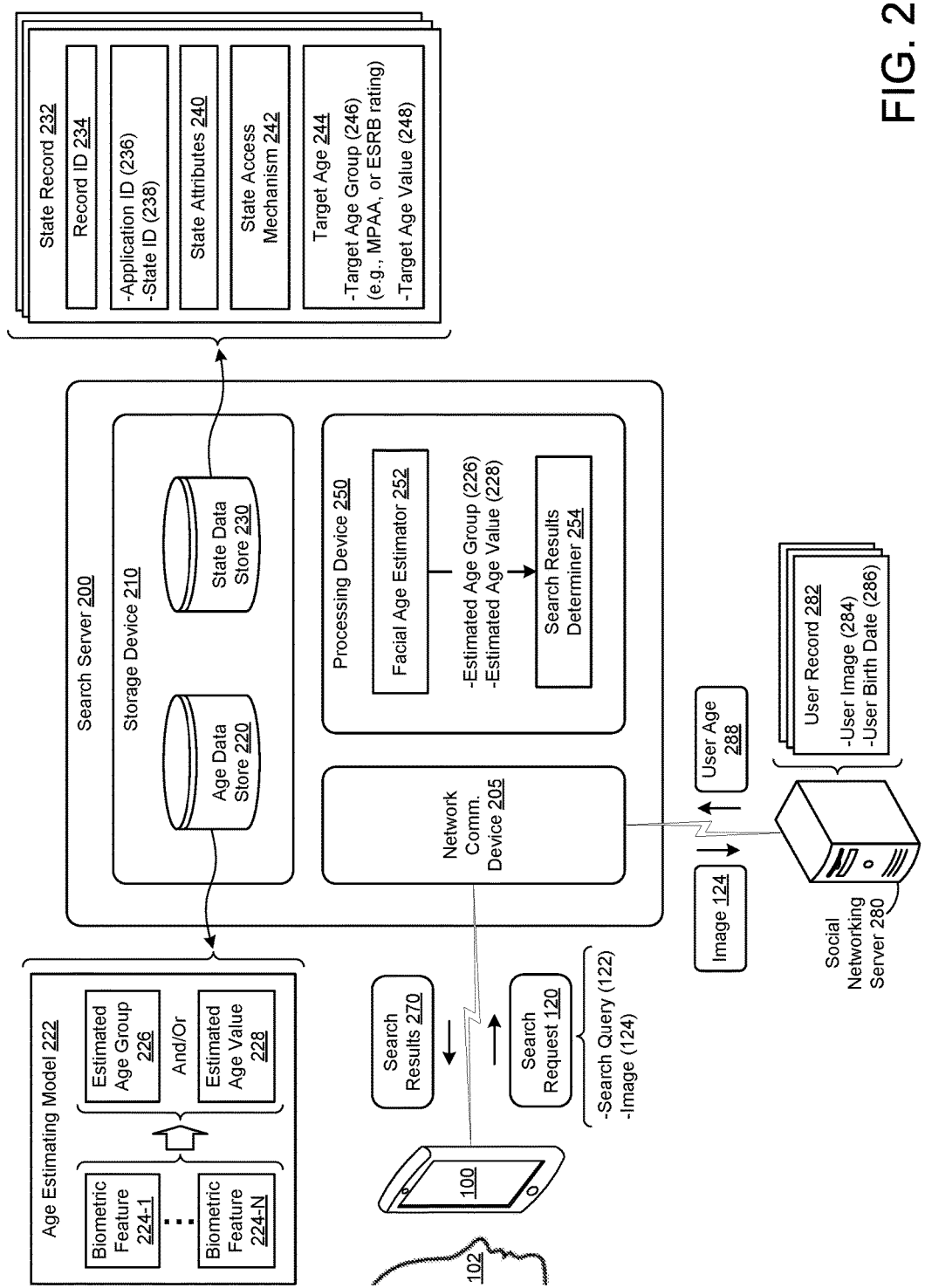
FIG. 2 is a block diagram of a search server that receives a search request from a mobile computing device, and provides search results to the mobile computing device based on an estimated age of a current user of the mobile computing device.

FIG. 2 illustrates an example block diagram of the search server 200. The search server 200 may include a network communication device 205, a storage device 210, and a processing device 250. The search server 200 may be implemented by a cloud computing platform. The cloud computing platform may include a collection of remote computing services. The cloud computing platform may include computing resources (e.g., the processing device 250). The computing resources may include physical servers that have physical central processing units (pCPUs). The cloud computing resources may include storage resources (e.g., the storage device 210). The storage resources may include database servers that support NoSQL, MySQL, Oracle, SQL Server, or the like. The cloud computing platform may include networking resources (e.g., the network communication device 205). Example cloud computing platforms include Amazon Web Services®, Google Cloud Platform®, Microsoft AZURE™ and Alibaba Aliyun™.

The network communication device 205 communicates with a network (e.g., the network 30 shown in FIG. 1). The network communication device 205 may include a communication interface that performs wired communication (e.g., via Ethernet, Universal Serial Bus (USB) or fiber-optic cables). The network communication device 205 may perform wireless communication (e.g., via Wi-Fi, Bluetooth, Bluetooth Low Energy (BLE), Near Field Communications (NFC), ZigBee, a cellular network, or satellites). The network communication device 205 may include a transceiver. The transceiver may operate in accordance with an Institute of Electrical and Electronics Engineers (IEEE) specification (e.g., IEEE 802.3 or IEEE 802.11). The transceiver may operate in accordance with a 3rd Generation Partnership Project (3GPP) specification (e.g., Code Division Multiple Access (CDMA), Long Term Evolution (LTE), or LTE-Advanced). The transceiver may operate in accordance with a Universal Serial Bus (USB) specification (e.g., via a USB port).

The storage device 210 stores data. The storage device 210 may include one or more computer readable storage mediums. For example, the storage device 210 may include solid state memory devices, hard disk memory devices, optical disk drives, read-only memory, and/or nanotube-based storage devices. The storage device 210 may be connected to the processing device 250 via a bus, and/or a network. Different storage mediums within the storage device 210 may be located at the same physical location (e.g., in the same data center, same rack, or same housing). Different storage mediums of the storage device 210 may be distributed (e.g., in different data centers, different racks, or different housings). The storage device 210 may store an age data store 220 that stores an age estimating model 222, and a state data store 230 that stores information regarding various application states.

Referring to the age data store 220, the age data store 220 may include an age estimating model 222. The search server 200 can utilize the age estimating model 222 to estimate the age of the user based on the image 124. The age estimating model 222 may include an aging face model. For example, the age estimating model 222 may include an anthropometric model that determines the age of the user 102 based on the measurements, and/or proportions of the face. The search server 200 may utilize the age estimating model 222 to determine an estimated age group 226 of the user 102. For example, the search server 200 can utilize the age estimating model 222 to determine whether the user 102 is an adult, or a minor (e.g., a child).

The age estimating model 222 may include a mapping of facial features 224 to an estimated age group 226, and/or an estimated age value 228. The facial features 224 may include distances between facial landmarks (e.g., eyes, nose, chin, top of head, etc.). For example, a first facial feature 224-1 may include a horizontal distance between a left eye, and a right eye (e.g., a first distance 460-1 shown in FIG. 4B). Another facial feature 224 may include a vertical distance from the center of the eyes to the nose (e.g., a second distance 460-2 shown in FIG. 4B). In some implementations, the facial features 224 may include ratios that are based on the distances between the facial landmarks. For example, a facial feature 224 may include a ratio of the horizontal distance between the eyes, and the vertical distance between the eyes and the nose (e.g., a first ratio 470-1 shown in FIG. 4B). See FIG. 4B for other distances 460, and ratios 470 that the age estimating model 222 may utilize as facial features 224. The facial features 224 may be referred to as biometric features. The age estimating model 222 may include a data structure such as a look-up table, or an index (e.g., an inverted index).

In some implementations, the age estimating model 222 may include an active appearance model (AAM) that determines the age of the user 102 by matching the face in the image 124 to a statistical face model. In such implementations, the age estimating model 222 model may estimate the age of the user 102 based on the shape of the face, and/or the texture of the facial skin. The age estimating model 222 may utilize a training set of annotated images in which the facial landmarks may have been identified by a human operator. The human operator may also specify an age for each image in the training set.

The age estimating model 222 may utilize other techniques to determine the estimated age group 226, and/or the estimated age value 228. For example, the age estimating model 222 may utilize any technique associated with classification of data items. Specifically, the age estimating model 222 may utilize techniques associated with classifying images into image categories. The image categories may be different age groups, and/or different age values.

The state data store 230 stores state records 232 that correspond with application states of various applications. A state record 232 may include a record ID 234 that identifies the state record 232. A state record 232 may include an application ID 236 that identifies an application, and a state ID 238 that identifies a particular state within the application. A state record 232 may include one or more state attributes 240 (e.g., a title, a description, a popularity, a rating etc.). A state record 240 may include a state access mechanism 240 that provides access to the corresponding state. The state access mechanism 240 may include a string that identifies the corresponding state, and provides access to the state. The state access mechanism 242 may include a uniform resource identifier (URI). The URI may be an application resource identifier (ARI). The state access mechanism 242 may include a uniform resource locator (URL) (e.g., a web URL, and/or an application URL).

A state record 232 may include a target age 244. The target age 244 may indicate an age for which the state record 232 is suitable, or relevant. The target age 244 may include a target age group 246, and/or a target age value 248. The target age group 246 may specify a range of ages for which the state record may be suitable, or relevant. The target age group 246 may include a rating that may have been determined by a rating authority. For example, if a state record 232 corresponds with a movie, the target age group 246 may include a rating determined in accordance with the MPAA (Motion Picture Association of America) film-rating system. In this example, the target age group 246 may include a rating such as "NC-17" to indicate that the corresponding state is not suitable for users that are 17 years old, or less than 17 years old. Similarly, if a state record 232 corresponds with a software product (e.g., a game), the target age group 246 may include a rating determined by the ESRB (Entertainment Software Rating Board). Example ESRB ratings include "Teen (T)" for ages 13 and older, "Mature (M)" for ages 17 and older, and "Adults Only (AO)" for adults only. The target age value 248 may include a specific number (e.g., an integer) that indicates an age for which the corresponding state may be suitable, or relevant. The target age 244 may be set by an operator that created that corresponding state (e.g., an application developer). Alternatively, the target age 244 may be set by a rating authority (e.g., MPAA, ESRB, etc.), or by users.

The processing device 250 may include a collection of one or more computing processors that execute computer readable instructions. The computing processors of the processing device 250 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 250 may execute computer-readable instructions that correspond with a facial age estimator 252, and a search results determiner 254.

The facial age estimator 252 estimates an age of the user 102 based on the image 124 included in the search request 120. The facial age estimator 252 can identify one or more facial features 224 in the image 224. For example, the facial age estimator 252 can identify certain facial landmarks (e.g., eyes, nose, chin, top of head, etc.) in the image 124. Upon identifying the facial landmarks, the facial age estimator 252 can compute various distances between the landmarks. See FIG. 4B for example distances 460 that the facial age estimator 252 may compute. Upon computing the distances, the facial age estimator 252 can utilize the distances to compute various ratios. See FIG. 4B for example ratios 470 that the facial age estimator 252 may compute. Upon computing the distances and/or the ratios, the facial age estimator 252 can utilize the age estimating model 222 to estimate age of the user 102. The distances and/or ratios that the facial age estimator 252 computes may be referred to as facial features 224. The facial age estimator 252 can query the age estimating model 222 with the facial features 224, and receive an estimated age group 226 and/or an estimated age value 228 from the age estimating model 222. See block 320 in FIG. 3, and the method 420 in FIG. 4A for example operations (e.g., instructions) that the facial age estimator 252 can perform (e.g., execute) to determine the estimated age group 226, and/or the estimated age value 228.

The search results determiner 254 can utilize the estimated age group 226 and/or the estimated age value 228 to identify state records 232 that may be relevant or suitable for the user 102. The search results determiner 254 can identify state records 232 that may be relevant to the search query 122. The search results determiner 254 can query the state data store 230 with the search query 122, and receive record IDs 224 for state records 232 that may be relevant to the search query 122. Querying the state data store 230 may include querying an inverted index that maps keywords to record IDs 234. The keywords may include terms from the state attributes 240. For example, the keywords may include a title for the state, a description for the state, etc. Put another way, the search results determiner 254 can identify state records 232 that may be relevant to the search query 122 by comparing the search terms of the search query 122 with the state attributes 240.

Upon identifying state records 232 that may be relevant based on the search query 122, the search results determiner 254 can select a set of state records 232 based on the estimated age group 226 and/or the estimated age value 228. The set of state records 232 selected based on the estimated age group 226 and/or the estimated age value 228 may be referred to as a consideration set of state records 232. The search results determiner 254 can determine whether to include a state record 232 in the consideration set based on a comparison of the target age 224 stored in the state record 232 with the estimated age. Specifically, the search results determiner 254 can compare the estimated age group 226 with the target age group 246 associated with a state record 232, and include the state record 232 in the consideration set if the target age group 246 matches the estimated age group 226. The search results determiner 254 can determine that the target age group 246 matches the estimate age group 226, if the target age group 246 is the same as (e.g., equal to) the estimated age group 226.

Similarly, the search results determiner 254 can compare the estimated age value 228 with the target age value 248 associated with a state record 232, and include the state record 232 in the consideration set if the target age value 248 is the same as (e.g., equal to) the estimated age value 228. In some implementations, the search results determiner 254 can include a state record 232 in the consideration set, if the target age value 248 and the estimated age value 228 are within a threshold of each other. For example, the search results determiner 254 can compute a difference between the estimated age value 228, and the target age value 248 of a state record 232. If the difference is less than the threshold, then the search results determiner 254 can include the state record 232 in the consideration set. If the difference is greater than the threshold, then the search results determiner 254 may not include the state record 232 in the consideration set.

Upon generating the consideration set of state records 232, the search results determiner 254 can score the state records 232 in the consideration set. The search results determiner 254 can generate a set of scoring features for each state record 232, and determine a relevance score for the state record based on the scoring features. The scoring features may include record scoring features, query scoring features, and/or record-query scoring features.

A record scoring feature may be associated with a state record 232. A record scoring feature may include data associated with a state that corresponds with the state record 232. For example, a record scoring feature may include the state attributes 240 from the state record 232. A record scoring feature may include parameters related to the state. A record scoring feature may include data that indicates a popularity of the state. For example, a record scoring feature may indicate a number of times that the state has been viewed. A record scoring feature may indicate a rating of the state (e.g., a number of stars associated with the state). A record scoring feature may include a Boolean value that indicates whether there is a target age 244 associated with the state record 232.

A query scoring feature may be associated with the search query 122. A query scoring feature may include data associated with the search query 122. Example query scoring features may include a number of words in the search query 122, a popularity of the search query 122, and/or an expected frequency of the words in the search query 122. A record-query scoring feature may include data that may be generated based on data associated with a state record 232 in the consideration set, and the search query 122. A record-query scoring feature may include parameters that indicate a number of matches between the terms of the search query 122, and the state record 232 in the consideration set. A record-query scoring feature may include a Boolean value that indicates whether the estimated age value 228 is within the target age group 246 associated with the state record 232.

One of the record-query scoring features may include an age scoring feature. The age scoring feature may indicate a difference between the estimated age value 228, and the target age value 248 that is associated with a state record 232. The search results determiner 254 can compute the age scoring feature by computing a difference between the estimate age value 228 and the target age value 248. The search results determiner 254 can utilize the age scoring feature to score the state records 232. For example, lower values for the age scoring feature may lead to a higher relevance score, whereas higher values for the age scoring feature may lead to a lower relevance score.

Another record-query scoring feature may include a binary scoring feature that indicates whether the estimate age group 226 matches (e.g., is equal to) the target age group 246. A value of one for this binary scoring feature may lead to a higher relevance score for a state record 232, whereas a value of zero for this binary scoring feature may lead to a lower relevance score. The search results determiner 254 can generate the search results 270 by retrieving information from the state records 232 that are in the consideration set. For example, the search results determiner 254 can retrieve the state attributes 240, and the state access mechanism 242. The search results determiner 254 can instantiate a data container (e.g., a JSON object, an XML file etc.). Upon instantiating the data container, the search result determiner 254 can write the information from the state records 232 into the data container, and transmit the data container to the mobile computing device 100.

In some implementations, the search server 200 may utilize the social networking server 280 to determine the age of the user 102. As described herein, the search server 200 may transmit the image 124 to the social networking server 280, and receive the user age 288 in return. The social networking server 280 may provide a set of application programming interfaces (APIs) that the search server 200 may utilize to receive the user age 288. The APIs may include RESTful (representational state transfer) APIs. In some scenarios, the search server 200 may utilize a POST request to send the image 124, and a GET request to receive the user age 288. The search server 200 may utilize the social networking server 280 instead of, or in addition to utilizing the facial age estimator 252. For example, the search server 200 may utilize the social networking server 280 when the facial age estimator 252 is unable to estimate the age of the user 102. Alternatively, the search server 200 may utilize the facial age estimator 252 when the social networking server 280 is unable to transmit a user age 288 (e.g., because the social networking server 280 could not match the image 124 with any of the stored user images 284).

Figure 3:
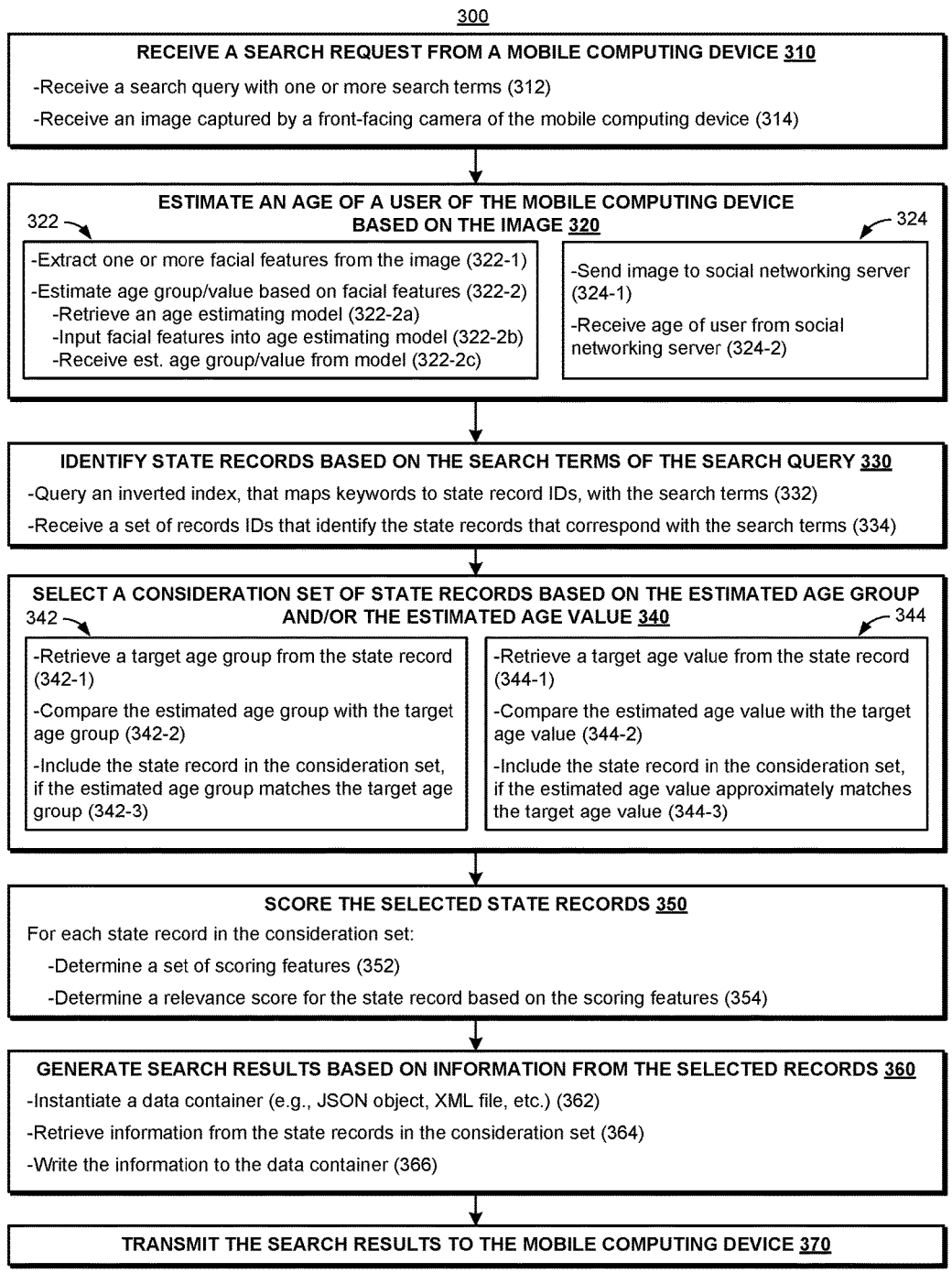
FIG. 3 is a block diagram of an example method for providing search results to a mobile computing device based on an estimated age of a current user of the mobile computing device.

FIG. 3 illustrates an example method 300 for determining search results for a mobile computing device based on the estimated age of a current user of the mobile computing device. The method 300 can be implemented as a set of computer readable instructions that may be executed by a computing processor of a search server (e.g., the processing device 250 of the search server 200 shown in FIG. 2). Generally, the search server receives a search request from a mobile computing device (at 310). The search request may include a search query, and an image captured by a front-facing camera of the mobile computing device. The search server can determine an estimated age of the user based on the image (at 320). At 330, the search server identifies state records that correspond with application states based on search terms included in the search query. The search server selects a consideration set of state records based on the estimated age of the user (at 340). At 350, the search server scores the state records in the consideration set. At 360, the search server generates search results based on the information stored in the state records that are in the consideration set. The search server transmits the search results to the mobile computing device (at 370).

Referring to 310, the search server receives a search request from a mobile computing device. Receiving the search request may include receiving a search query with one or more search terms (at 312). Receiving the search request may also include receiving an image that may have been captured by a front-facing camera of the mobile computing device (at 314). Hence, the image may include a photographic representation of the face of a user that is currently using the mobile computing device. The search server may receive the search query and the image concurrently. Alternatively, the search server may first receive the search query, and then receive the image.

Referring to 320, the search server estimates an age of the current user of the mobile computing device based on the image. Of note, the current user of the mobile computing device may be different from a primary user of the mobile computing device. For example, the current user may be a child of the primary user of the mobile computing device. Also, the current user may be logged into the mobile computing device as the primary user. For example, a child may be logged-in under a user name that belongs to his parent. Hence, the age associated with a user name of the mobile computing device may not be an accurate representation of the age of the current user. The search server may estimate the age of the current user based on one or more facial features indicated by the image (at 322). Alternatively, the search server may utilize a social networking server to determine the age of the current user (at 324).

Referring to 322, the search server can extract one or more facial features from the image (at 322-1). Extracting the facial features may include identifying facial landmarks, and measuring distances between the facial landmarks. Examples of the facial landmarks include the eyes, the nose, the chin, the top of the head, etc. See FIG. 4B for example distances 460, and example ratios 470 that the search server may determine. The search server can estimate the age of the current user based on the facial features (at 322-2). Estimating the age may refer to estimating an age group, and/or estimating an age value. The search server may include an age estimating model (e.g., the age estimating model 222 shown in FIG. 2). The search server can retrieve the age estimating model (at 322-2a). The search server can input the facial features (e.g., the distances 460, and/or the ratios 470 shown in FIG. 4B) into the age estimating model (at 322-2b), and receive an estimate age of the current user from the model (at 322-2c). See FIG. 4A for another example method that the search server can execute to estimate the age of the current user based on the image.

Referring to 324, the search server may utilize a social networking server (e.g., the social networking server 280 shown in FIGS. 1 and 2) to determine the age of the current user. Specifically, the search server may send the image to the social networking server (at 324-1). In response to sending the image, the search server may receive an age of the current user from the social networking server (at 324-2). Receiving the age may refer to receiving an age value, and/or an age group. The search server may utilize an application programming interface (API) to send the image, and receive the age. The API may include a RESTful (representational state transfer) API.

Referring to 330, the search server can identify state records based on the search terms of the search query. In other words, the search server may identify state records that may be relevant to the search query. The search server can query a state data store (e.g., the state data store 230 shown in FIG. 2) to identify state records that may be relevant to the search query. Specifically, the search server can query an inverted index, which maps keywords to state record IDs, with the search terms (at 332). Upon such a query, the search server can receive record IDs that identify the state records that correspond with the search terms (at 334). Alternatively, the search server can compare the search terms with information stored in the state records. For example, the search server can compare the search terms with a title of the state record, a description of state record, etc. If the search terms match the title, or the description of a state record, then the search server can determine that the state record may be relevant to the search query.

At 340, the search server selects a consideration set of state records based on the estimated age group, and/or the estimated age value. The search server can generate the consideration set by comparing an estimated age group with target age groups associated with state records (at 342). Alternatively or additionally, the search server can generate the consideration set by comparing an estimated age value with target age values associated with state records (at 344). Referring to 342, the search server can retrieve a target age group from a state record (at 342-1). The search server can compare the estimated age group with the target age group (at 342-2). The search server can include the state record in the consideration set based on the comparison (at 342-3). For example, the search server can include a state record in the consideration set, if the estimated age group matches the target age group associated with the state record. The search server may determine that the estimated age group matches the target age group, if the estimated age group is the same as (e.g., is equal to) the target age group.

Referring to 344, the search server can retrieve a target age value from a state record (at 344-1). The search server can compare the estimated age value with the target age value (at 344-2). The search server can include the state record in the consideration set based on the comparison of the estimated age value with the target age value (at 344-3).

For example, the search server can include the state record in the consideration set, if the estimated age value approximately matches the target age value. The search server may compute a difference between the estimated age value and the target age value. If the difference is less than a threshold, then the search server can include the state record in the consideration set. If the difference is greater than the threshold, then the search server may not include the state record in the consideration set.

At 350, the search server scores the selected state records. In other words, the search server determines a relevance score for each state record in the consideration set. The search server can determine a set of scoring features for a state record (at 352), and determine the relevance score for the state record based on the scoring features (at 354). As described herein, the scoring features may include query scoring features, record scoring features, and/or record-query scoring features. One or more of the scoring features may be age-related. For example, a scoring feature may indicate a difference between the estimated age value, and the target age value. In this example, a lower value for this scoring feature may lead to a higher relevance score for the state record, whereas a higher value for this scoring feature may lead to a lower relevance score for the state record. Similarly, another scoring feature may include a Boolean value that indicates whether the estimated age group and target age group are the same. In this example, a value of one may lead to a higher relevance score for a state record, whereas a value of zero may lead to a lower relevance score for the state record.

Referring to 354, the search server may score a state record based the record scoring feature(s), the query scoring feature(s), and/or the record-query scoring feature(s). The search server may include a machine learned model(s) (e.g., a supervised learning model). The machine learned model may be configured to receive the scoring features, and score the state records based the scoring features. Specifically, the search server may determine a feature vector that includes the record scoring feature(s), the query scoring feature(s), and/or the record-query scoring feature(s). The search server may use the feature vector as an input for a machine-learned regression model to calculate a score for the state record. The machine-learned regression model may include a set of decision trees (e.g., gradient boosted decision trees). The machine-learned regression model may include a logistic probability formula. A machine learned task can be implemented as a semi-supervised learning task, where a portion of the training data is labeled with human-curated scores, and the remaining training data may be used without human-curated scores.

At 360, the search server generates search results based on the information included in the state records that are in the consideration set. At 362, the search server instantiates a data container. The data container may include a JSON (JavaScript Object Notation) object, an XML file, etc. At 364, the search server retrieves information from the state records that are in the consideration set. Retrieving the information may include retrieving the state attributes (e.g., a text string, or an image), and/or the state access mechanism (e.g., a URI). At 366, the search server can write the retrieved information to the data container. At 370, the search server can transmit the search results to the mobile computing device.

Figure 4A:
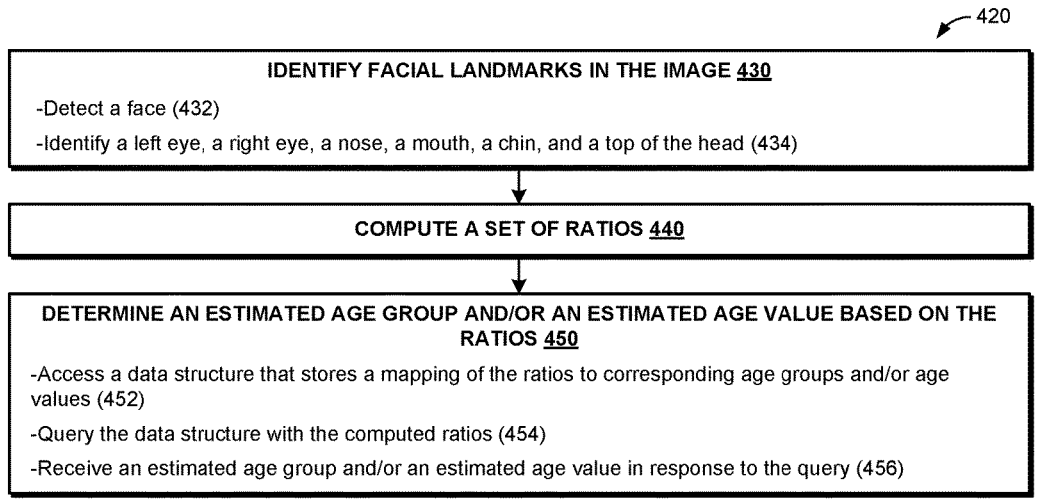
FIG. 4A is a block diagram of an example method for estimating the age of the current user of the mobile computing device.

FIG. 4A illustrates a method 420 for estimating an age group and/or an age value of a user based on an image of the user. The method 420 may be implemented as a set of computer readable instructions that may be executed by a computing processor of a search server (e.g., the processing device 250 of the search server 200 shown in FIG. 2). The search server may execute the method 420 when the search server is executing block 320 shown in FIG. 3. Generally, the search server identifies facial landmarks (at 430). Upon identifying the facial landmarks, the search server can compute a set of distances between the facial landmarks, and/or a set of ratios between the distances (at 440). At 450, the search server can determine an estimated age group, and/or an estimated age value based on the ratios.

Referring to 430, the search server detects a face in the image (at 432). The search server may utilize any face detection technique to detect the face. Example face detection techniques may include techniques that are based on the genetic algorithm, and/or the eigen-face technique. At 434, the search server identifies various facial landmarks. The facial landmarks may include the eyes (e.g., the left eye, and the right eye), the nose, the mouth, and/or the top of the head. Other facial landmarks are also contemplated. The search server may utilize various techniques to identify the facial landmarks (e.g., the genetic algorithm). For example, the search server may identify the eyes by determining a gray-level image (e.g., a grayscale image), and testing all the valley regions in the gray-level image.

Figure 4B:
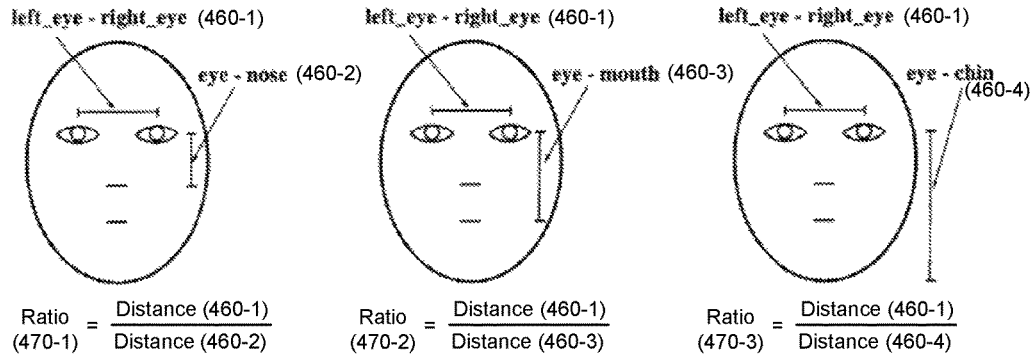
FIG. 4B is a diagram that illustrates example facial features that the search server may utilize to estimate the age of a user based on an image included in a search request.
Figure 4B:
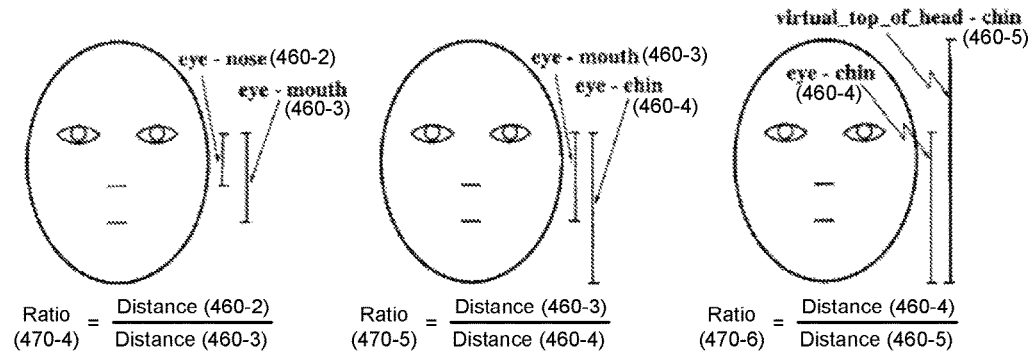

At 440, the search server computes a set of ratios (e.g., the ratios 470 shown in FIG. 4B). Computing the ratios may include determining distances (e.g., the distances 460 shown in FIG. 4B) between the facial landmarks. Referring to FIG. 4B, the search server may identify a first distance 460-1 between the left eye and the right eye, a second distance 460-2 from the eyes to the nose, a third distance 460-3 from the eyes to the mouth, a fourth distance 460-4 from the eyes to the chin, and a fifth distance 460-5 from the top of the head to the chin. The search server can utilize the distances 460 to compute the ratios 470. For example the search server can compute a first ratio 470-1 by dividing the first distance 460-1 with the second distance 460-2, or vice-versa. The search server can compute a second ratio 470-2 by dividing the first distance 460-1 with the third distance 460-3, or vice-versa. The search server can compute a third ratio 470-3 by dividing the first distance 460-1 with the fourth distance 460-4, or vice-versa. The search server can compute a fourth ratio 470-4 by dividing the second distance 460-2 with the third distance 460-3, or vice-versa. The search server can compute a fifth ratio 470-5 by dividing the third distance 460-3 with the fourth distance 460-4, or vice-versa. The search server can compute a sixth ratio 470-6 by dividing the fourth distance 460-4 with the fifth distance 460-5, or vice-versa. The search server may compute other ratios that may be based on other distances.

At 450, the search server determines an estimated age group and/or an estimated age value based on the ratios. The search server may include an age estimating model that maps the ratios to age groups and/or age values. The age estimating model may be a machine-learned model. The machine-learned model may include a set of decision trees (e.g., gradient boosted decision trees). The machine-learned model may include a logistic probability formula. The machine-learned model can be implemented as a semi-supervised learning task, where a portion of the training images are labeled with human-curated ages, and the remaining training data may be used without human-curated age.

At 452, the search server can access the age estimating model. Accessing the age estimating model may include accessing a data structure that stores a mapping of the ratios to the corresponding age groups and/or corresponding age values. At 454, the search server can query the data structure with the ratios that the search server computed. In response to such a query, the search server can receive an estimated age group, and/or an estimated age value from the data structure (at 456). The data structure may include an inverted index, a lookup table, etc. As described herein, the data structure may be a machine-learned model that receives the ratios, and outputs the estimated age group and/or the estimated age value.

Figure 5:
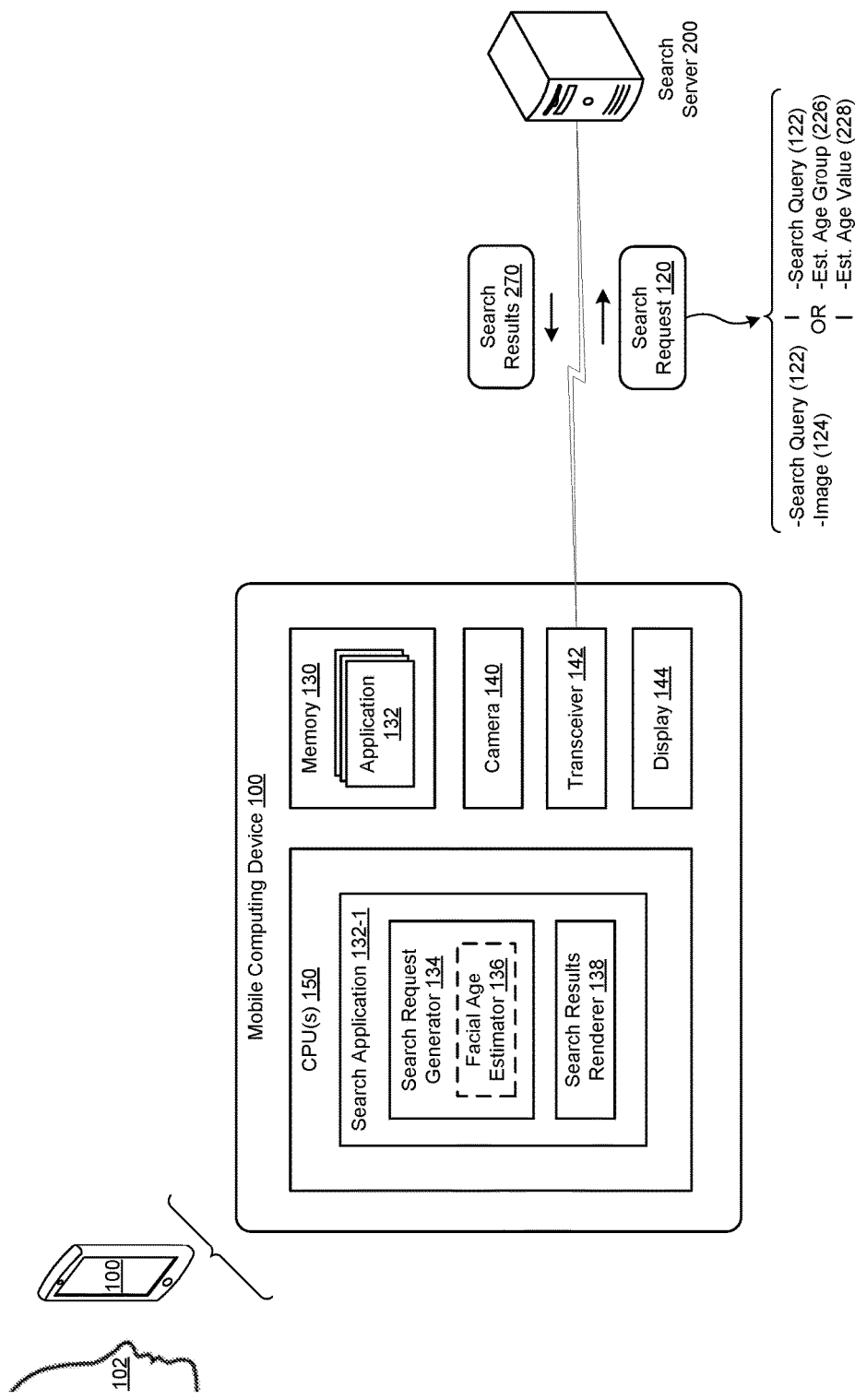
FIG. 5 is a block diagram of a mobile computing device that displays search results based on an estimated age of a current user of the mobile computing device.

FIG. 5 illustrates a block diagram for the mobile computing device 100. The mobile computing device 100 may include a memory 130, a camera 140, a transceiver 142, a display 144, and one or more central processing units (CPUs) 150. In some implementations, the mobile computing device may include a computing processor that includes the one or more CPUs 150, the transceiver 142, and other components (e.g., sensors such as a global positioning system). The memory 130 may store one or more applications 132. The applications 132 may be referred to as native applications, for example, because the applications 132 are installed at the mobile computing device 100. The applications 132 may include a search application 132-1.

The one or more CPUs 150 may execute a set of computer readable instructions that correspond with the search application 132-1. The search application 132-1 may include a search request generator 134, and a search results renderer 138. In some implementations, the search request generator 134 may include a facial age estimator 136. The search request generator 134 generates the search request 120 upon receiving the search query 122 from the user 102. The mobile computing device 100 can receive the search query 122 via the display 144, or via a microphone (not shown). The search request generator 134 can cause the camera 140 to capture the image 124 upon receiving the search query 122 from the user 102. The search request generator 134 instantiates a data container that represents the search request 120. The mobile computing device 100 writes the search query 122, and the image 124 to the data container. The search request generator 134 can transmit the search request 120 to the search server 200 via the transceiver 142, and receive the search results 270 in response to transmitting the search request 120. The search results renderer 138 renders the search results 270 when the mobile computing device 100 receives the search results 270. Rendering the search results 270 may include displaying the search results 270 on the display 144.

In some implementations, the search request generator 134 may include a facial age estimator 136 that determines the estimated age group 226 and/or the estimated age value 228 based on the image 124 captured by the camera 140. The facial age estimator 136 may operate similar to the facial age estimator 252 shown in FIG. 2. For example, the facial age estimator 136 may execute the operations indicated by block 320 in FIG. 3, and/or the operations indicated by the method 420 in FIG. 4A. In such implementations, the search request generator 134 may include the estimated age group 226 and/or the estimated age value 228, instead of the image 124, in the search request 120. The search request generator 134 may include the estimated age group 226 and/or the estimated age value 228, instead of the image 124, if the user 102 has indicated that the user 102 does not want the mobile computing device 100 to transmit the image 124 to the search server 300. For example, the mobile computing device may include a privacy setting that the user 102 can configure. The privacy setting may indicate whether the mobile computing device 100 can transmit the image 124. If the privacy setting indicates that the mobile computing device 100 may not transmit the image 124, then the facial age estimator 136 can determine the estimated age group 226 and/or the estimated age value 228. Moreover, the search request generator 134 may not include the image 124 in the search request 120 based on the privacy setting. Instead, the search request generator 134 may include the estimated age group 226, and/or the estimated age value 228 in the search request 120.

Figure 6:
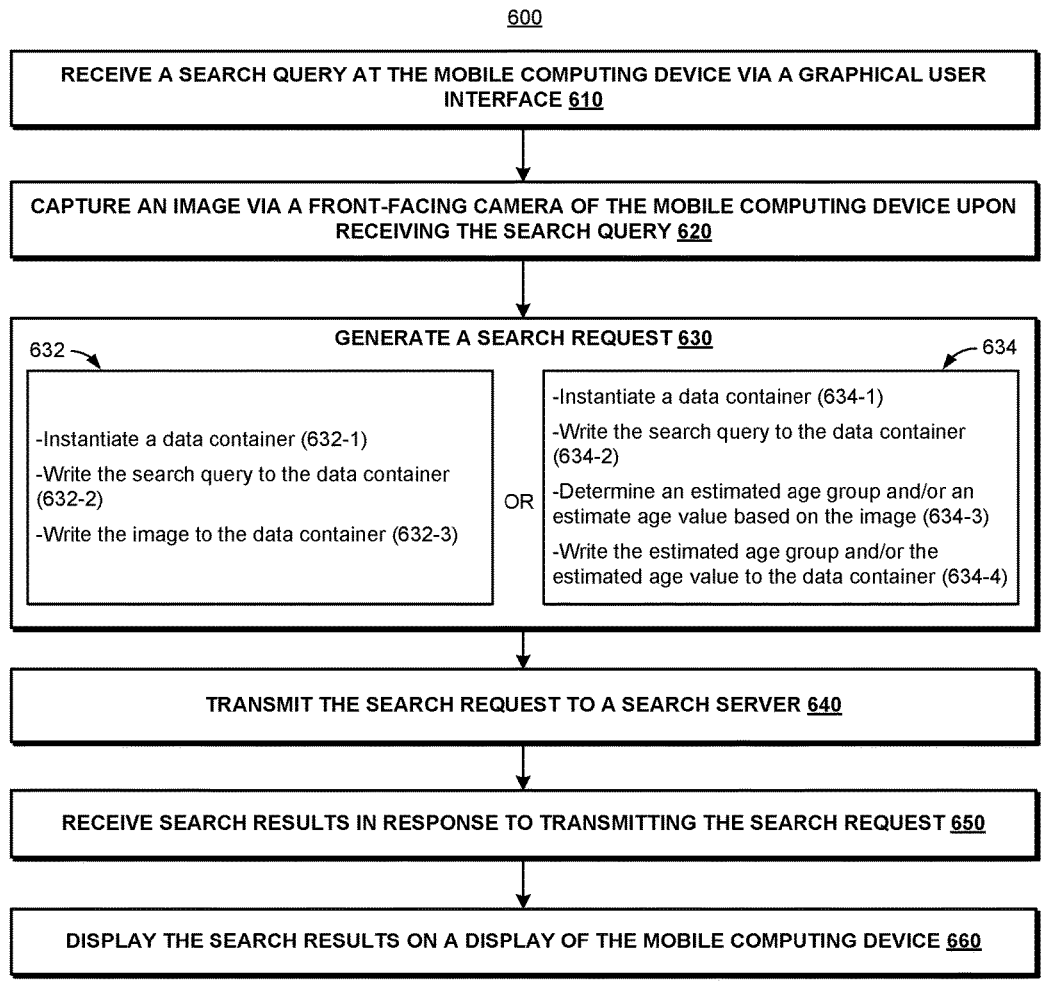
FIG. 6 is a block diagram of an example method for displaying search results at a mobile computing device based on an estimated age of a current user of the mobile computing device.

FIG. 6 illustrates a method 600 for displaying search results at a mobile computing device based on an estimated age of a user of the mobile computing device. The method 600 may be implemented as a set of computer readable instructions that may be executed by a computing processor of the mobile computing device. (e.g., by the one or more CPU(s) 150 shown in FIG. 5). At 610, the mobile computing device receives a search query via a graphical user interface. Upon receiving the search query, the mobile computing device can capture an image via a front-facing camera of the mobile computing device (at 620). Since the image is captured via the front-facing camera, the image may include a photographic representation of the face of the current user of the mobile computing device.

The mobile computing device generates a search request (at 630). The search request may include the image (at 632), or the search request may include an estimated age that is determined based on the image (at 634). Referring to 632, the mobile computing device may instantiate a data container that represents the search request (at 632-1). The mobile computing device can write the search query to the data container (at 632-2). The mobile computing device can write the image to the data container (at 632-3).

Referring to 634, the mobile computing device instantiates a data container (at 634-1). The mobile computing device writes the search query to the data container (at 634-2). The mobile computing device determines an estimated age group, and/or an estimated age value based on the image (at 634-3), and writes the estimated age group and/or the estimated age value to the data container (at 634-4). Determining the estimated age group and/or the estimated age value may include executing computer readable instructions that correspond with the block 320 in FIG. 3, and/or the method 420 in FIG. 4A. The mobile computing device may perform the operations indicated by 634, instead of the operations indicated by 632, when a user-specified privacy setting indicates that the mobile computing device may not transmit the image to a search server.

At 640, the mobile computing device transmits the search request to the search server. At 650, the mobile computing device receives search results in response to transmitting the search request. At 660, the mobile computing device displays the search results on a display of the mobile computing device. As described herein, the search server may determine the search results based on an estimate of the age of the current user. Hence, the search results that the mobile computing device displays are based on an estimate of the age of the current user. Moreover, the age of the current user is estimated based on an image that the mobile computing device captures upon receiving the search query from the current user.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., LCD (liquid crystal display) monitor, or touch screen for displaying information to the user and optionally a keyboard and a pointing device, e.g., a mouse, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A search server comprising: a network communication device;
   a storage device that stores state records, each state record comprising:
      information corresponding to an application state; and
      a target age that indicates at least one of a target age group or a target age value for the application state; and
   a processing device that executes computer-readable instructions that, when executed by the processing device, cause the processing device to:
      receive, via the network communication device, a search request from a mobile computing device, the search request comprising one or more search terms, and an image of a user, the image being captured by the mobile computing device;
      extract one or more facial features from the image, the facial features indicating distances between facial landmarks;
      determine an estimated age of the user based on one or more ratios of the facial features extracted from the image, wherein the facial features include a distance between facial landmarks of the user and the facial landmarks include at least two of a left eye, a right eye, a center of eyes, a nose, a mouth, a chin, or a top of head;
      identify one or more state records based on the one or more search terms;
      filter the identified one or more state records based on the target age for each of the identified one or more state records and the estimated age;
      generate search results based on the information stored in each of the filtered one or more state records; and
      transmit the search results to the mobile computing device via the network communication device.

2. The search server of claim 1,
   wherein the storage device stores an age estimating model database that maps facial features to estimated ages, and
   wherein the determining of the estimated age of the user comprises: retrieving the age estimating model database from the storage device;
      providing the one or more facial features extracted from the image to the age estimating model database; and
      receiving the estimated age of the user from the age estimating model database.

3. The search server of claim 1, wherein the determining of the estimated age of the user comprises determining at least one of an estimated age group or an estimated age value.

4. The search server of claim 1, wherein the identifying of the one or more state records comprises:
   querying the one or more state records stored in the storage device with the one or more search terms; and
   receiving one or more record identifiers (IDs) for the one or more state records that correspond with the one or more search terms.

5. The search server of claim 4, wherein the querying of the one or more state records comprises querying an inverted index that maps keywords to the one or more record IDs.

6. The search server of claim 1,
   wherein the filtering of the identified one or more state records comprises:
      for each of identified one or more state records:
         retrieving the target age from a state record;
         comparing the estimated age with the target age; and
         including the state record in a consideration set of one or more state records based on the comparison between the estimated age and the target age;
      for each state record in the consideration set:
         computing one or more scoring features; and
         determining a relevance score for the state record based on the one or more scoring features for the state record, and
      wherein the search results are generated based on the information stored in the filtered one or more state records that are in the consideration set.

7. The search server of claim 6, wherein the comparing of the estimated age with the target age comprises:
   determining whether an estimated age group is the same as a target age group; and
   including the state record in the filtered one or more state records, if the estimated age group is the same as the target age group.

8. The search server of claim 6, wherein the computing of the one or more scoring features comprises:
   computing an age scoring feature that indicates a difference between the estimated age and the target age; and
   determining the relevance score of the state record based on the age scoring feature.

9. The search server of claim 6, wherein the computing of the one or more scoring features comprises:
   computing a binary scoring feature that indicates whether the estimated age is equal to the target age; and
   determining the relevance score based on the binary scoring feature.

10. A computer-implemented method for providing search results, the computer-implemented method comprising:
   receiving, via a network communication device of a search server, a search request from a mobile computing device, the search request comprising one or more search terms, and an image of a user, the image being captured by the mobile computing device;
   extracting, at a processing device of the search server, one or more facial features from the image, the facial features indicating distances between facial landmarks;
   determining, at the processing device, an estimated age of the user based on one or more ratios of the facial features extracted from the image, wherein the facial features include a distance between facial landmarks of the user and the facial landmarks include at least two of a left eye, a right eye, a center of eyes, a nose, a mouth, a chin, or a top of head;
   identifying, by the processing device, one or more state records stored in a storage device of the search server, based on the one or more search terms; filter the identified one or more state records based on a target age for each of the identified one or more state records and the estimated age;
   generating, by the processing device, search results based on the information stored in each of the filtered one or more state records; and
   transmitting, via the network communication device, the search results to the mobile computing device.

11. The computer-implemented method of claim 10, wherein the determining of the estimated age of the user comprises:
   retrieving an age estimating model database from the storage device; providing the one or more facial features extracted from the image to the age estimating model database; and
   receiving the estimated age of the user from the age estimating model database.

12. The computer-implemented method of claim 10, wherein the determining of the estimated age of the user comprises determining at least one of an estimated age group or an estimated age value.

13. The computer-implemented method of claim 10, wherein the identifying of the one or more state records comprises:
   querying the one or more state records stored in the storage device with the one or more search terms; and
   receiving one or more record identifiers (IDs) for the one or more state records that correspond with the one or more search terms.

14. The computer-implemented method of claim 10, wherein the filtering of the identified one or more state records comprises: computing a difference between an estimated age value and a target age value; and
   including the state record in the filtered one or more state records, if the difference is less than a threshold.

15. A computer program product encoded on a non-transitory computer readable storage medium comprising instructions that when executed by a processing device, of a search server, cause the processing device to perform operations comprising:
   receiving, via a network communication device of the search server, a search request from a mobile computing device, the search request comprising one or more search terms, and an image of a user, the image being captured by the mobile computing device;
   extracting one or more facial features from the image, the facial features indicating distances between facial landmarks;
   determining an estimated age of the user based on one or more ratios of the facial features extracted from the image, wherein the facial features include a distance between facial landmarks of the user and the facial landmarks include at least two of a left eye, a right eye, a center of eyes, a nose, a mouth, a chin, or a top of head;
   identifying one or more state records stored in a storage device of the search server, based on the one or more search terms;
   filtering the identified one or more state records based on the target age for each of the identified one or more state records and the estimated age;
   generating search results based on the information stored in each of the filtered one or more state records; and
   transmitting, via the network communication device, the search results to the mobile computing device.

16. The computer program product of claim 15, wherein the determining of the estimated age of the user comprises:
   retrieving an age estimating model database from the storage device;
   providing the one or more facial features extracted from the image to the age estimating model database; and
   receiving the estimated age of the user from the age estimating model database.

17. The computer program product of claim 15, wherein the filtering of the identified one or more state records comprises:
   determining whether an estimated age group is the same as a target age group; and
   including the state record in the filtered one or more state records, if the estimated age group is the same as the target age group.

18. The computer program product of claim 15, wherein the filtering of the identified one or more state records comprises:
   computing an age scoring feature that indicates a difference between the estimated age and the target age; and
   determining a relevance score of the state record based on the age scoring feature.

19. The computer program product of claim 15, wherein the filtering of the identified one or more state records comprises:
   computing a binary scoring feature that indicates whether the estimated age is equal to the target age; and
   determining a relevance score based on the binary scoring feature.

20. The search server of claim 6, wherein the comparing of the estimated age with the target age comprises:
   computing a difference between an estimated age value and the target age value; and including the state record in the filtered one or more state records, if the difference is less than a threshold.

\* \* \* \* \*